US009532500B1

(12) United States Patent
Fulghum et al.

(10) Patent No.: US 9,532,500 B1
(45) Date of Patent: Jan. 3, 2017

(54) DIGGER FOR RHIZOMES AND THE LIKE

(71) Applicants: Michael Edward Fulghum, Tarrytown, GA (US); Thomas Logan Fazio, Jupiter, FL (US); William Travis Hedrick, High Point, NC (US)

(72) Inventors: Michael Edward Fulghum, Tarrytown, GA (US); Thomas Logan Fazio, Jupiter, FL (US); William Travis Hedrick, High Point, NC (US)

(73) Assignee: Repreve Renewables, LLC, Greensboro, NC (US)

( * ) Notice: Subject to any disclaimer, the term of this patent is extended or adjusted under 35 U.S.C. 154(b) by 63 days.

(21) Appl. No.: 14/170,573

(22) Filed: Feb. 1, 2014

(51) Int. Cl.
*A01D 25/04* (2006.01)

(52) U.S. Cl.
CPC .......... *A01D 25/044* (2013.01); *A01D 25/048* (2013.01)

(58) Field of Classification Search
CPC ....................................................... A01D 31/00
USPC ............. 171/20, 25, 61, 62; 56/327.2, 327.1
See application file for complete search history.

(56) References Cited

U.S. PATENT DOCUMENTS

| 1,803,131 A * | 4/1931 | Pierson .......................... 460/89 |
| 3,026,001 A | 3/1962 | Landgraf |
| 3,078,926 A * | 2/1963 | Ries et al. ...................... 171/14 |
| 3,365,869 A * | 1/1968 | Whiteley .................... 56/327.1 |
| 3,420,239 A * | 1/1969 | Lorenzen ..................... 460/147 |
| 3,999,613 A * | 12/1976 | Porter ............................. 171/14 |
| 4,008,826 A | 2/1977 | Carree ............................ 221/13 |
| 4,965,993 A * | 10/1990 | Butler et al. ................ 56/327.1 |
| 5,417,293 A | 5/1995 | Leader .......................... 172/721 |
| 6,722,297 B1 | 4/2004 | Nelson, Jr. .................... 111/104 |
| PP23,489 P3 | 3/2013 | Baldwin |

FOREIGN PATENT DOCUMENTS

| FR | 2960121 | 11/2011 | ............. A01C 9/00 |
| JP | 07107829 A * | 4/1995 | ............. A01D 17/00 |

OTHER PUBLICATIONS

"Enhanced Vegetative Cultivation of Miscanthus Rhizomes," Gavin Maxwell Coolfin Partnership, UIUC Bioenergy Symposium 2012.
Miscanthus Planter Machinery, Manufacturers and Suppliers, W.H. Loxton, Ltd., retrieved from the internet May 2013.

(Continued)

*Primary Examiner* — Robert Pezzuto
*Assistant Examiner* — Jessica H Lutz
(74) *Attorney, Agent, or Firm* — MacCord Mason PLLC

(57) ABSTRACT

An apparatus for harvesting rhizomes includes a chassis to move in a field. Coulter disks mounted on a forward end of the chassis break up soil on a top surface of the field. Digger blades aft of the coulter disks scoop clusters of rhizomes from the field with adhered soil. An inclined ramp on the chassis has a live bottom that pushes the rhizome clusters up the ramp in the aft direction including upright posts that force the clusters of rhizomes against depending obstructers extending downward from superstructure bars toward the live bottom. As the clusters encounter the obstructers, the clusters are broken to reduce their size and to loosen and separate soil from the rhizomes. A collector aft of the live bottom collects rhizomes falling from an aft end of the inclined ramp.

18 Claims, 4 Drawing Sheets

(56) References Cited

OTHER PUBLICATIONS

"Planting and Managing Freedom Giant Miscanthus for Biofuel Using the Biomass Crop Assistance Program," USDA, NRCS, Jul. 2011.
"Planting and Growing Miscanthus," Best Practice Guidelines, Jul. 2007.
"Series GL cup planting machines," Grimme Harvesting Success, Potato Technology; undated, admitted prior art.
"Planting and Managing Giant Miscanthus as a Biomass Energy Crop, "Technical Note No. 4, USDA, NRCS Jul. 2011.
"Demonstration of Giant Miscanthus Equipment," [on line] https://222.youtube.com/watch?v-VAQwG_PWnt0&feature—youtu.be, Mar. 10, 2011 [retrieved Nov. 18, 2015].
Rhizome, Root, Sprig Harvester, [on line] http://spriggerschoice.com/index_files/RHIZOMEROOTSPRIGHARVESTER.htm [retrieved Nov. 18, 2015].

\* cited by examiner

DIGGER FOR RHIZOMES AND THE LIKE

BACKGROUND OF THE INVENTION

Developments in the plant propagation and perennial crop production industry have generated the need for an efficient planting system. One arena of vegetative propagation includes planting live processed rhizomes, tubers, nodal stem cuttings, or cane pieces. The present invention has been developed for these types of plant propagules, such as Rhizomes of *Miscanthus* or *Arundo*; Cane pieces such as sugar cane, Miscanes, Napiergrass, Energy Cane and crops such as Potatoes and Horseradish. Giant *Miscanthus* (*Miscanthus giganteus*) (M×g) will be discussed herein to exemplify the use of the invention, but the machine and its use are not limited to Giant *Miscanthus*, and references to rhizomes herein should be interpreted to include such tubers, nodal stem cuttings or cane pieces. Much background information on the cultivation of *Miscanthus* can be obtained from "Planting and Managing Giant *Miscanthus* as a Biomass Energy Crop," U.S. Dept. of Agriculture, Natural Resources Conservation Service, Plant Materials Program, Technical Note No. 4, July 2011, the entire disclosure of which is incorporated herein by reference (hereinafter referred to as "NRCS publication.)

M×g used in this crop demonstration is a sterile hybrid, warm-season perennial grass that is native to Asia. The variety is commercially known as 'Freedom' (See U.S. Plant Patent Publication PP 23,489, the entire disclosure of which is incorporated herein by reference). It can produce large amounts of biomass, across several temperate latitudes, due to its high range of adaptability in both warm and cool climates, and in various soil types.

Sterile M×g propagates and grows from rhizomes, and is becoming widely accepted for various agriculture and biorenewable products. Underground rhizomes can range from a few (20-40) to several hundred per plant depending on age, growing environment, and genetics of the individual genotype or clone. These parameters are the focus of efforts in regards to growing, digging rhizomes for seeding new fields, processing of rhizomes, and planting the crop.

Solid and efficient establishment of any vegetative propagated crop is to for the crop's success. Challenges in the establishment of rhizome planted crops like M×g include weed competition, and provision of healthy viable rhizomes, planting date, and moisture availability. It is most important that stand density and subsequent plant populations are adequate for optimizing yield. Dense stands require little or no weed control after the establishment year.

Description of Plant Material

In general, if not directly transplanted from rhizome harvest, rhizomes can be stored and not lose viability for a period of time, depending on storage conditions. Proper temperature and moisture levels during storage are may be critical to maintaining viability. Fields typically can be planted between February and June, depending upon latitude, soil temperature and soil moisture level, while being mindful that frost damage can occur. Rhizomes should be planted between 3 and 4 inches deep in moist soil. Planting rates can vary, depending upon many factors. The desired final population is between 6000-10,800 plants per acre, with the quantity depending on soil quality and water availability. This usually requires planting a minimum of 6,000 rhizomes per acre. Recommended spacing varies between 36-inch rows by 36-inch spacing; 30-inch rows with 30-inch spacing; 30-inch rows by 24-inch spacing; or 24-inch rows by 24-inch spacing, depending on plant population density required for an optimal stand. Modified corn planters, potato planters, carousel planters and vegetable planters have been recommended to be used to plant rhizomes. These recommendations are not of the device described herein. After planting rhizomes, the field should be rolled to ensure good soil contact with the rhizomes.

Giant *miscanthus* can be harvested with a silage harvester, or mowed and baled. Regardless of the harvest method used, a 2-4 inch stubble height is recommended to maximize yield, but avoid picking up the leaf litter.

Rhizome Quality—

Age of mother plants affects rhizome quality and rhizome quality affects stand establishment. In one European study cited in the NRCS publication, survival was 88 percent with rhizome pieces from 5-year-old plants compared to only 25 percent for rhizomes from 1-year-old plants and 52 percent for rhizomes from 9-year-old plants. Preliminary work in Mississippi has shown better rhizome quality from 2-year-old plants than from 4-year-old plants. These studies indicate that quality of rhizome increases with mother plant age, but only up to a certain point.

For field planting, according to the NRCS publication, a plantable quantity of rhizomes should weigh about 1.5 to 2 ounces (50 g) and the rhizomes should be about 4 to 5 inches long, but can be smaller depending on variety and species type where smaller or larger rhizomes maintain acceptable viability. Rhizome quantity per drop is adjusted to ensure good establishment while reducing the risk of amount to excess surplus and waste. For M×g, good quality rhizomes pieces can be branched or unbranched pieces, and should appear scaly and buff colored. Typically they will have small feeder roots attached. Those feeder roots can entangle with the roots of adjacent rhizomes in a bulk container.

Rhizome Yield—

Age of mother plant also affects rhizome yield according to the NRCS publication. Hand dug, 1-year-old plants were found to produce 7 to 10 harvestable rhizomes, 2-year-old plants produced 25 to 30 harvestable rhizomes, and 3-year-old plants produced 75 to 80 harvestable rhizomes (Pyter et al. 2009). Yield of mechanically dug rhizomes is not as high. The European rule of thumb is that for each acre of 4-year-old *miscanthus* mother field, one can expect enough rhizomes to plant 8 to 10 acres.

Digging Considerations—

Rhizomes can be dug anytime in the fall or winter period after the plants have senesced and biomass removed. However, the most common time for harvesting for field planting is in the spring prior to shoot emergence. Rhizomes should be used as soon as possible after digging, but they can be stored temporarily if kept cool and moist. This can be accomplished by covering the rhizome heap with moist soil, but it is critical that the rhizomes not be allowed to dry out or go through a heat. Additionally, care should be taken to not let rhizomes dry out during transport.

Depending on planting method used, the rhizomes also may need to be cleaned and sized. Sizing is particularly critical to ensure rhizomes pieces will feed through the transplanter openings. Follow planter manufacturer's directions or do test runs to determine what size rhizome pieces are best used for the variety, and or species to be planted.

Planting Depth—

Regardless of the type of planting equipment used, giant *miscanthus* rhizomes should be planted between 2 and 4 inches deep.

Planting Rate—

Plant populations between 4,000 and 16,000 plants per acre have been evaluated. Higher numbers provide earlier canopy closure and weed control, but are more expensive to establish with relatively little improvements in long-term yield. However, year 1 and 2 establishment yields have shown improvement with the higher stand densities and require less overall weed control. The consensus among researchers is that the desired final population should be between 4,000 and 5,000 plants per acre. Since large rhizome (1.5-2 oz) survival usually averages 60 to 70 percent, this means 6,000 to 7,000 rhizomes per acre are needed to get the final recommended stand. The higher rate should be used for less optimum conditions (e.g., soils with lower water holding capacity, higher expected weed competition, late planting, etc.). With irrigation, establishment survival should be higher, and lower rates may be practical. However, the quality of the rhizome is important in any condition.

Row Spacing—

According to one recommendation, in the Midwest plant using 30-inch rows with 30-inch spacing between plants. This is based on two factors. One is the need to use up to 7,000 rhizomes per acre to get the desired final stand density, and the second is that research has shown that actually leaving equal space around each rhizome or plug gives better first season growth. Given variability in the planting equipment available, slight variations in the 30-by 30-inch spacing would be reasonable as long as plant population is maintained Planting Methods—

Most research stands of giant *miscanthus* have been established by hand planting rhizomes as space plants or by dropping rhizomes into furrows that were subsequently covered up. Broadcast planting followed by disking in and packing was the earliest mechanical method of planting rhizome pieces, but issues with consistent planting depth and the need for tillage to control weeds prompted the modification and use of standard row planting equipment.

Modified corn drills and potato planters have been used to plant rhizomes, and vegetable or tobacco planters have been used for transplants or plugs. European and American equipment manufacturers have actively been modifying and/or developing planting equipment to plant both rhizome pieces and transplants.

Table 1 lists some of the manufactures advertising specialized giant *miscanthus* planting equipment for the United States or Canadian market in 2011. In the case of rhizomes, the field should be rolled after planting to ensure good soil contact and few air spaces unless otherwise directed by the planter manufacturer. Irrigation is recommended after planting if transplants or plugs are used, and additional applications may be warranted the first growing season. If available, irrigation also may be warranted to speed the establishment and, thus, first-year survival of rhizome-planted field.

TABLE 2

Effect of planting arrangement on the number of rhizomes or plugs per acre

| Row spacing | Within row spacing Inches | No. rhizomes or plugs/acre |
| --- | --- | --- |
| 30 | 24 | 8,700 |
| 30 | 30 | 7,000 |
| 36 | 24 | 7,000 |

TABLE 2-continued

Effect of planting arrangement on the number of rhizomes or plugs per acre

| Row spacing | Within row spacing Inches | No. rhizomes or plugs/acre |
| --- | --- | --- |
| 36 | 30 | 6,000 |
| 36 | 36 | 5,000 |

Despite these advances in the art of *miscanthus* cultivation, there remains a need for improved machinery and processes for retrieving rhizomes from mature plants, processing them to produce suitable planting stock, and re-planting the rhizome planting stock in fields.

Table 2 indicates various known density adjustments per acre associated with row and plant spacing.

TABLE 1

Dedicated giant miscanthus digging and planting equipment available for United States/Canadian market in 2011

| Available from | Web address |
| --- | --- |
| WHL | miscanthusplanter.com |
| Spriggers | spriggerschoice.com/index_files/ |
| Choice | miscanthuspropergationmachinery.htm |
| Cool Fin Partnership | bioenergyfeedstocks.igb.uiuc.edu/2010/ppt/maxwell.pdf |

Despite these advances in the art of *miscanthus* cultivation, there remains a need for improved machinery and processes for retrieving rhizomes from fields in which they have grown. A preferred planter is disclosed in our co-pending application entitled "Planter for Rhizomes and the like" Ser. No. 14/170,572, filed on Feb. 1, 2014. A preferred processor is disclosed in our co-pending application entitled "Processor for Rhizomes and the like" Ser. No. 14/170,578, filed on Feb. 1, 2014. The disclosures of those two applications are incorporated herein by reference. The present invention is advantageously used in combination with those two inventions, but they are not required.

SUMMARY OF THE INVENTION

The present invention fulfills one or more of these needs in the art by providing an apparatus for harvesting rhizomes from a field of soil in which rhizome-bearing plants have grown. The apparatus is typically used after harvesting the bio mass stock growing above ground. A chassis having wheels moves in a primary direction over an area of the field in which rhizome-bearing plants have grown, the primary direction defining a forward and aft sense.

Coulter disks are mounted on a forward end of the chassis, with digger blade that can be set to varying depths, of 0 to 8 inches deep. Tines aft of the blade move forward and backward to loosen debris before entering an incline. An inclined ramp on the chassis has a live bottom mounted to move clusters of rhizomes up the ramp in the aft direction including upright posts that move over the live bottom to catch and push the clusters of rhizomes up the inclined ramp. The ramp has superstructure bars extending above the live bottom that have obstructers extending downward from the superstructure bars toward the live bottom. A collector aft of the live bottom collects rhizomes falling from an aft end of the inclined ramp. As the chassis moves over the field of rhizome-bearing plants, the coulter disks break up soil on a top surface of the field, the digger blades scoop clusters of rhizomes from the field with adhered soil, the upright posts on the live bottom catch and push clusters of rhizomes and soil up the inclined ramp and as clusters encounter the obstructers, the cluster is broken to reduce its size and to loosen and separate soil from the rhizomes, and the rhizomes are collected by the collector.

In a preferred embodiment the live bottom includes endless chains on left and right sides of the live bottom and a drive mechanism to drive the chains in endless paths parallel to one another at left and right sides of the live bottom. The cross-members connect the endless chains across the live bottom, and the upright posts are mounted on at least some of the cross-members that move over the live bottom as the endless chains are driven. Typically, the upright posts are spaced apart from one another and the obstructers are spaced apart from one another. As the upright posts move upward on the inclined ramp, as least some of the upright posts pass between the obstructers, so that rhizome clusters being pushed by the upright posts impact the obstructers. The obstructers may have sharpened edges facing the forward direction so that they can divide rhizome clusters into smaller clusters.

The collector may include a second inclined ramp extending from the chassis and having a live bottom mounted to move rhizomes up the second inclined ramp including upright posts that move over the live bottom of the second ramp to catch and push rhizomes up the second inclined ramp to allow the rhizomes to be dropped into a transport container.

The tines may have an aft end that is pivotally mounted to the chassis. Agitators for the tines mounted on the chassis move the front ends of the tines forward and backward by pivoting about the pivotal mount at the aft end of the tines as the chassis moves over the field of rhizome-bearing plants.

The chassis may have a hitch to enable the apparatus to be pulled over the field of rhizome-bearing plants, such as by a tractor. The chassis may have a forwardly-extending rotatable shaft to connect to a power take-off on a tractor and mechanical linkages from the shaft to drive the live bottom to move the rhizomes up the ramp.

The invention can also be considered as a method of harvesting rhizomes from a field of soil in which rhizome-bearing plants have grown. The method includes breaking up soil on a top surface of the field, scooping clusters of rhizomes from the field with adhered soil, catching the clusters of scooped rhizomes on a mechanism that pushes the clusters of rhizomes to a location where the clusters of rhizomes encounter obstructers that reduce the size of the cluster and loosens and separates soil from the cluster of rhizomes, and collecting the reduced-size clusters of rhizomes.

The obstructers and the mechanism that pushes the clusters of rhizomes typically cooperate to force the reduction in size of the clusters of rhizomes. The obstructers may cut the clusters. Catching and pushing the clusters of rhizomes includes pushing the clusters up a slope, so that separated soil can fall back down the slope to return to the field.

Collecting the reduced-size clusters of rhizomes may include pushing the clusters up a second slope, so that separated soil can fall back down the slope to return to the field. Pushing the clusters up a second slope may includes pushing the clusters up a perforated slope so separated soil can fall through the perforations to return to the field.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

*Miscanthus* plants grow with rhizomes underground. The rhizomes proliferate and branch from one another as the plant grows, forming a large cluster of stick-like pieces. It is desirable to retrieve the clusters of rhizomes from mature plants and to break them up to form starting material for new plants in plant propagation. The rhizomes will have developed naturally as the *miscanthus* plant grows, forming an intricate network that is interleaved with the soil in which the plant is growing, forming a secure grasp of the plant on the soil. Thus to retrieve the cluster of rhizomes requires specialized equipment to be described.

Figure 1:
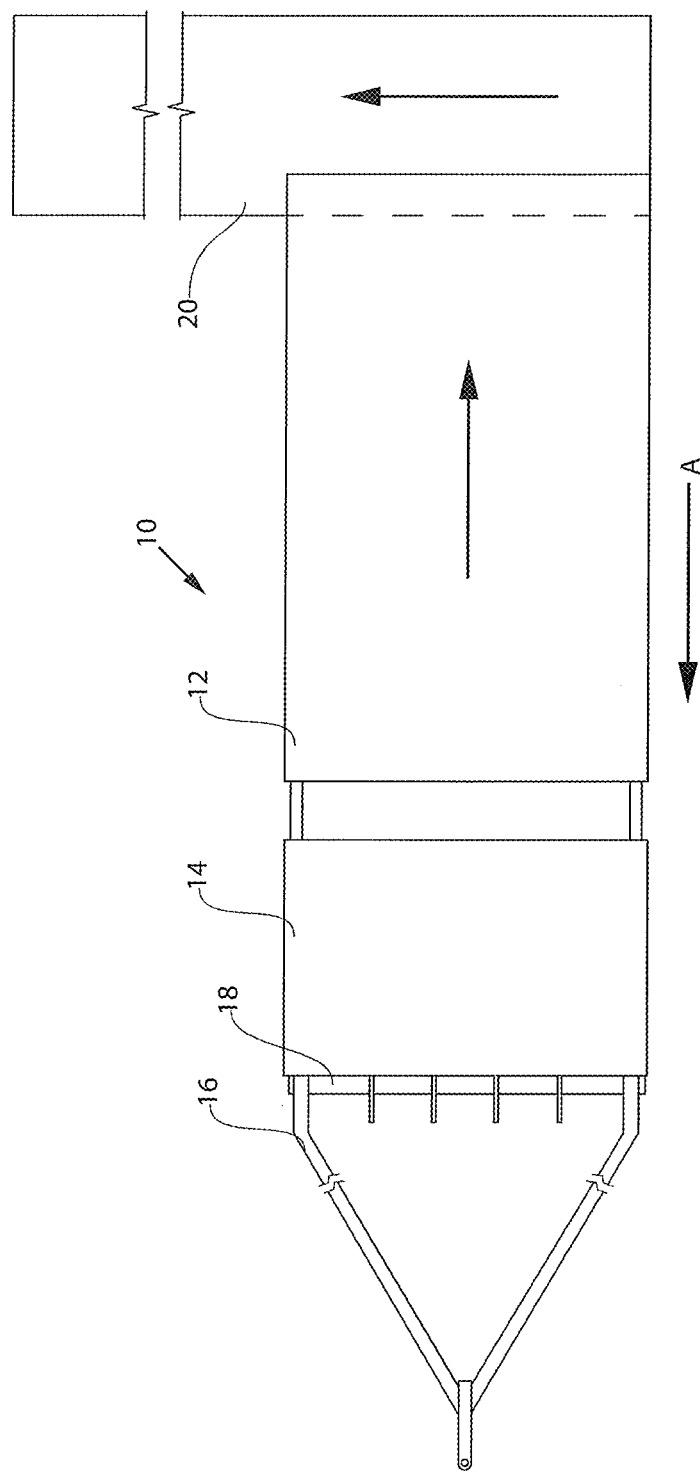
FIG. 1 is a schematic plan view of an embodiment of a *miscanthus* rhizome digger in accordance with the invention.

FIG. 1 is a plan view of a preferred embodiment of a digger for *miscanthus* rhizomes. The apparatus 10 includes a forward part 14 which can be acquired from Bartschi-Fobro A.G., Bernstrasse 26, CH-6152 Huswil, Switzerland (fobro.com). The Fobro apparatus includes a tow yoke 16 and a coulter disk 18 mounted on a chassis 14, that also includes digger blades, not shown in FIG. 1. Rearward of the Fobro unit 14 is a mechanism 12 that includes an inclined ramp with a live bottom to raise dug-up *miscanthus* clusters, reduce them in size, and knock dirt from them. The clusters travel up the inclined ramp 12 and are dropped into a second inclined ramp 20, where further dirt removal takes place, and the clusters are dropped into an adjoining truck or other container (not shown). FIG. 1 shows that the overall direction of travel of the apparatus is in the direction of the arrow A at the bottom of the Figure.

Figure 2:
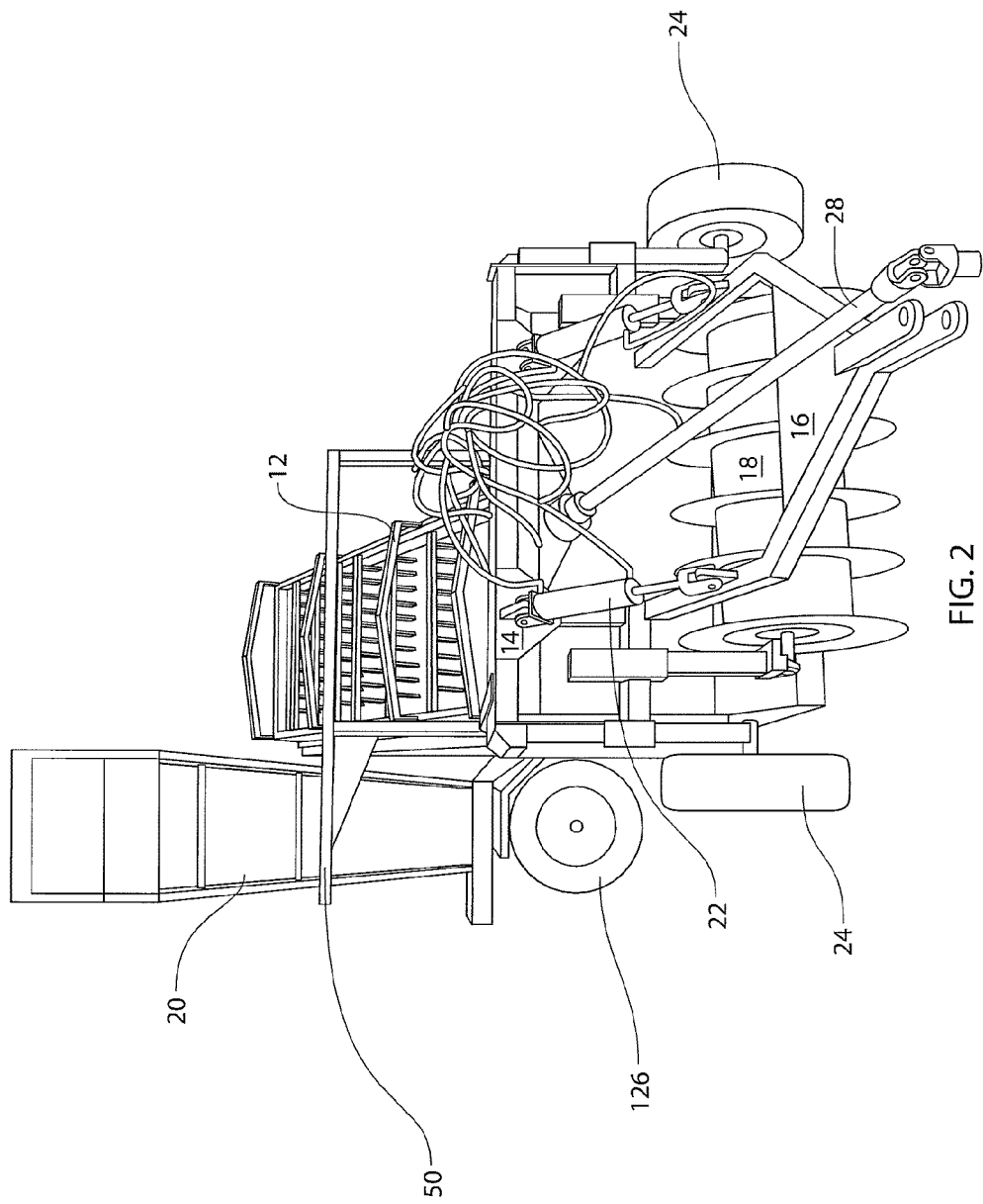
FIG. 2 is a front right perspective view of the embodiment of FIG. 1, ready of transport over a highway.

FIG. 2 is a front side perspective view of the apparatus, with the second inclined ramp 20 pivoted to be substantial parallel with the first inclined ramp 12 to make a more compact apparatus to travel over the road. In addition, rear wheels 26 of the second inclined ramp are shown raised, to allow the apparatus to travel over the road. The base of the second ramp is raised to elevate the wheels 26. A support bracket 50 can be included to allow the second inclined ramp 20 to be lowered onto it for additional support during over the road transport of the mechanism.

FIG. 2 shows the tow yoke 16 of the Fobro apparatus 14. The coulter disks 18 are formed on a drum that is journaled in the bearings in the bottom of a height adjustment apparatus, and hydraulic cylinders 22 raise and lower the yoke 16, as needed. A power take off shaft 28 extends forwardly of the Fobro chassis 14 to connect it to a power take off fitting on a towing tractor. The chassis 14 is provided with wheels 24 to allow the apparatus to run smoothly over a field, and on a road. Shown to the rear of the Fobro chassis 14 is the first inclined ramp 12.

Figure 3:
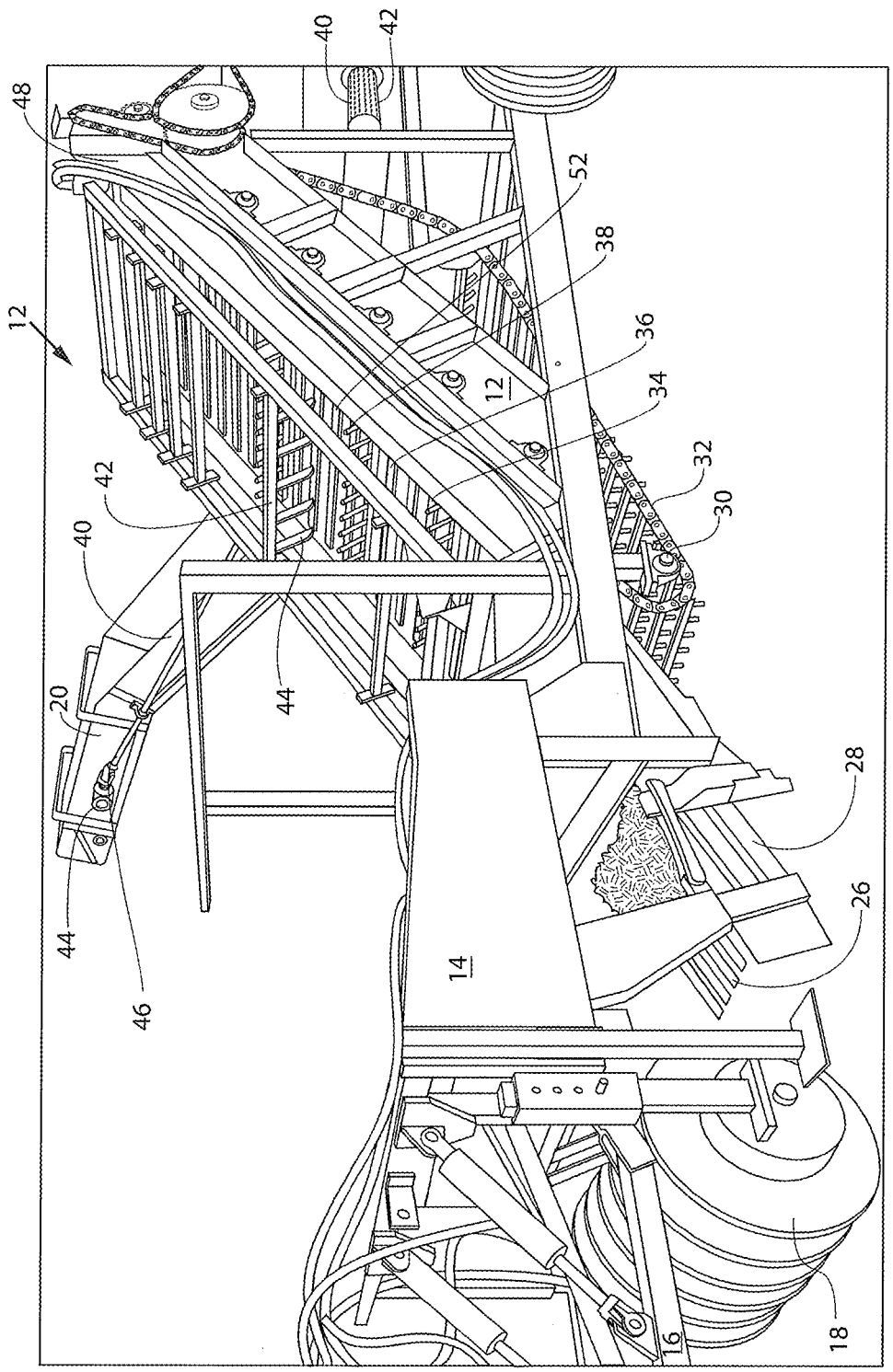
FIG. 3 is a left front perspective view of the embodiment of FIG. 1, ready for operation in a field.

Referring now to FIG. 3, a different view of the apparatus is seen, from the left front of the apparatus. The Fobro digger blades 26 are seen more clearly in FIG. 3, along with a shaker apparatus 28. The coulter disks 18 cut through crop residue and divide the soil along lines in the direction of travel to cause divisions laterally and break any hard crust on the surface of the soil. The blades 26 extend down into the soil to scoop up clusters of rhizomes. The blades lift the root mass material, and an attached head moves the blade in a forward and back motion at a depth of 2 to 8 inches to cut rootmass material evenly. To the rear of the blades, tines are oscillated by the shaker 28. This shaking movement causes considerable amount of the soil otherwise adhered to the rhizome cluster to fall away and stay in the field from which the rhizomes are being collected. As rhizomes are dug by the blades 26, newly dug rhizome clusters push previously dug rhizome clusters rearward, where they can be engaged by an endless chain component of the first inclined ramp.

The first inclined ramp 12 has a sloping bottom 52 that allows dirt to slide back down the bottom 52 under the influence of gravity on the incline 12. Trained around sprockets 30 and a sprocket attached to hydraulic motor 48 is a chain 32. A similar chain and sprocket assembly on the other side of the ramp 12 is positioned substantially parallel with the chain 32. Slats 36 span between links of the chain 32 and the chain on the other side. Selected ones of the slats 36 have upright posts 38 mounted on them. As clusters of rhizomes exit the rear of the tines, one or more travelling posts 38 engage with the cluster to push and carry the cluster up the inclined ramp 12.

Spaced above the inclined ramp 12 is a frame 42 having downwardly extending obstructors 44. Preferably the obstructors 44 are shaped with a leading knife edge, and are staggered across the width of the ramp 12, so that as the posts 38 travel up the ramp, they pass between the obstructors 44. Clusters of rhizomes traveling on the post 38 encounter the obstructors 44. The force of the post 38 pressing the clusters against the obstructer 44 will tend to cut or break the cluster of rhizomes into a smaller cluster. Also, dirt that has been adhering to the cluster will be dislodged and be allowed to fall onto the bottom 52 to fall back to the ground. Vibration resulting from operation of the device may also shake dirt from the cluster and aid its descent down the bottom 52. The clusters then continue up over the top of the ramp 12 past the hydraulic motor 48.

From there the reduced-size clusters fall into a second conveyor 40 having one end journaled on a sprocket 42, and the other journaled with a drive motor 44. The conveyor 40 is perforated, preferably an open weave chain, so that additional dirt can fall through the conveyor to fall on the ground as the clusters travel up the conveyor 40 to be discharged past the motor 44. Typically, a truck travels alongside the apparatus, and the clusters fall from the ramp 20 into the bed of the truck. The drive motor 44 is provided with power through a connected shaft 46 connecting back through by linkages which can be devised by those of ordinary skill in the art to the power take off shaft 28.

Figure 4:
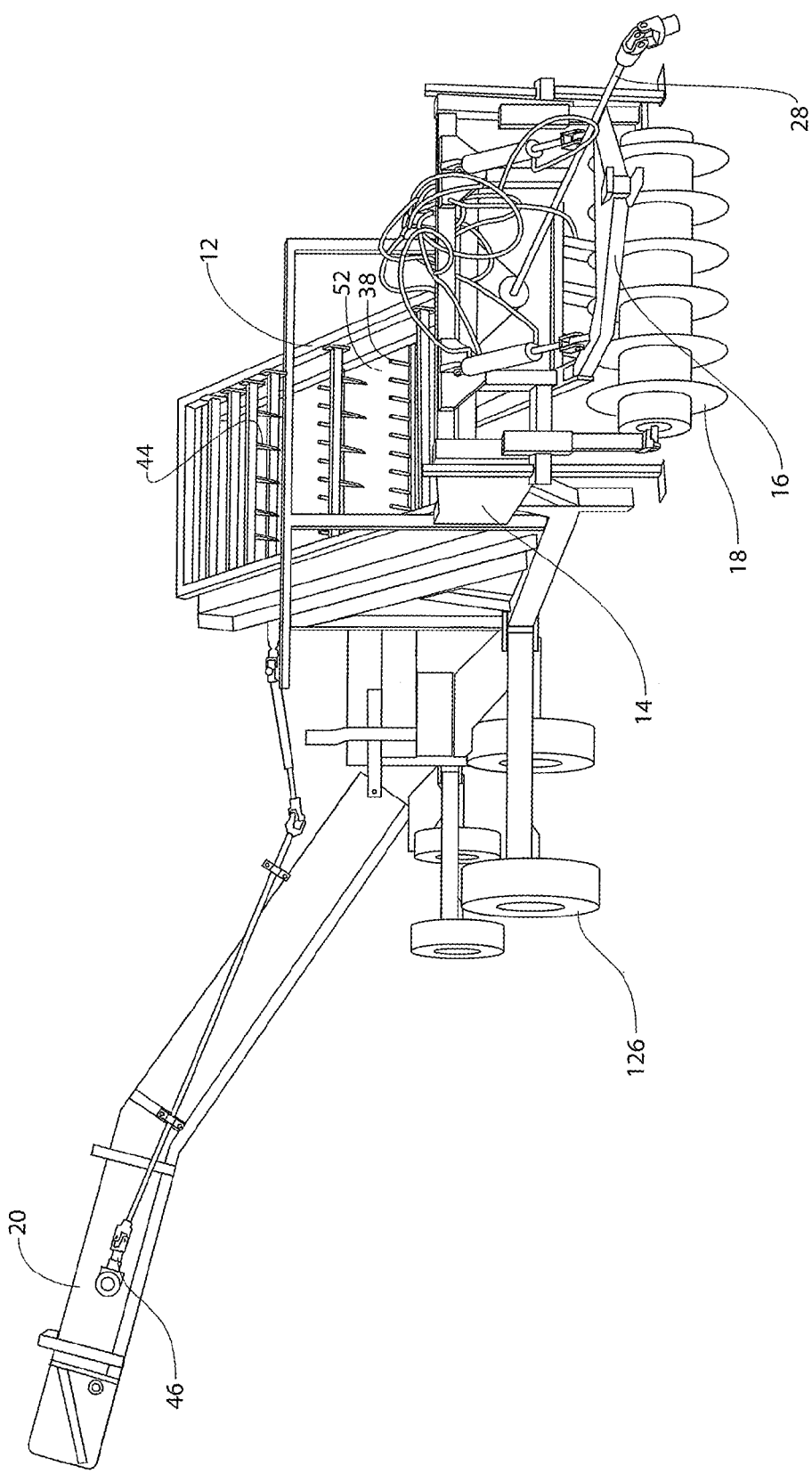
FIG. 4 is a front right perspective view of the embodiment of FIG. 1, ready for operation in a field.

FIG. 4 shows another view of the deployed apparatus, showing an outrigger with tire 126 to help provide balance for the cantilevered second ramp 20.

The mechanisms to cause the various movements described herein are well known to those who are skilled in the art and can be devised from the description set forth herein. Power sources other than the power take off of a tractor can be used, such as hydraulic motors, electric motors and the like.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An apparatus for harvesting rhizomes from a field of soil in which rhizome-bearing plants have grown comprising
    a chassis having wheels to move in a primary direction over an area of the field in which rhizome-bearing plants have grown, the primary direction defining a forward and aft sense,
    coulter disks on a forward end of the chassis,
    digger blades aft of the coulter disks,
    an inclined ramp on the chassis having a live bottom mounted to move clusters of rhizomes up the ramp in the aft direction including upright posts that move over the live bottom to catch and push the clusters of rhizomes up the inclined ramp,
    the ramp provided with superstructure bars extending above the live bottom and having obstructers extending downward from the superstructure bars toward the live bottom, and
    a collector aft of the live bottom to collect rhizomes falling from an aft end of the inclined ramp,
    whereby as the chassis moves over the field of rhizome-bearing plants, the coulter disks break up soil on a top surface of the field, the digger blades scoop clusters of rhizomes from the field with adhered soil, the upright posts on the live bottom catch and push clusters of rhizomes and soil up the inclined ramp and as clusters encounter the obstructers, the cluster is broken reduce its size and to loosen and separate soil from the rhizomes, and the rhizomes are collected by the collector.

2. The apparatus as claimed in claim 1 wherein the live bottom includes endless chains on left and right sides of the live bottom and a drive mechanism to drive the chains in endless paths parallel to one another at left and right sides of the live bottom, cross-members connecting the endless chains across the live bottom and the upright posts are mounted on at least one of the cross-members that move over the live bottom as the endless chains are driven.

3. The apparatus as claimed in claim 1 wherein the upright posts are spaced apart from one another and obstructers are spaced apart from one another and as the upright posts move upward on the inclined ramp as least some of the upright posts pass between the obstructers, so that rhizome clusters being carried by the upright posts impact the obstructers.

4. The apparatus as claimed in claim 1 wherein the collector includes a second inclined ramp extending from the chassis and having a live bottom mounted to move rhizomes up the second inclined ramp including upright posts that move over the second live bottom to catch and push rhizomes up the second inclined ramp to allow the rhizomes to be dropped into a transport container.

5. The apparatus as claimed in claim 4 wherein the obstructers have sharpened edges facing the forward direction so that they can divide rhizome clusters into smaller clusters.

6. The apparatus as claimed in claim 1 wherein tines downstream of the digger blades have an aft end that is pivotally mounted to the chassis, and agitators for the tines mounted on the chassis cause front ends of the tines to move up and down by pivoting about the pivotal mount at the aft end of the tines as the chassis moves over the field of rhizome-bearing plants.

7. The apparatus as claimed in claim 1 wherein the chassis has a hitch to enable the apparatus to be pulled over the field of rhizome-bearing plants.

8. The apparatus as claimed in claim 1 wherein the chassis has a forwardly-extending rotatable shaft to connect to a power take-off on a tractor and mechanical linkages to drive the live bottom to move the rhizomes up the ramp.

9. The apparatus as claimed in claim 1 wherein the digger blades are in line with the coulter disks in the primary direction, so that the coulter disks cut through crop residue and divide the soil along lines in the direction of travel to cause divisions laterally to be followed by the digger blades extending down into the soil to scoop up clusters of rhizomes.

10. An apparatus for harvesting rhizomes from a field of soil in which rhizome-bearing plants have grown comprising
a chassis having wheels to move in a primary direction over an area of the field in which rhizome-bearing plants have grown, the primary direction defining a forward and aft sense and a hitch to enable the apparatus to be pulled forward over the field of rhizome-bearing plants, the chassis also having a forwardly-extending rotatable shaft to connect to a power take-off on a tractor,
coulter disks on a forward end of the chassis,
aft of the coulter disks, blades to dig rhizomes from the ground are followed by tines that have an aft end that is pivotally mounted to the chassis and agitators for the tines mounted on the chassis to cause front ends of the tines to move up and down by pivoting about the pivotal mount at the aft end of the tines as the chassis moves over the field of rhizome-bearing plants,
an inclined ramp on the chassis having a live bottom mounted to move rhizomes up the ramp in the aft direction including upright posts that move over the live bottom to catch and push rhizomes up the inclined ramp, including endless chains on left and right sides of the live bottom and a drive mechanism driven by power from the rotatable shaft to drive the chains in endless paths parallel to one another at left and right sides of the live bottom, cross-members connecting the endless chains across the live bottom and the upright posts are mounted on at least one of the cross-members that move over the live bottom as the endless chains are driven,
the ramp provided with superstructure bars extending above the live bottom and having obstructers extending downward from the superstructure bars toward the live bottom, wherein the upright posts are spaced apart from one another and the obstructers are spaced apart from one another and have sharpened edges facing the forward direction, so as the upright posts move upward on the inclined ramp as least some of the upright posts pass between the obstructers, so that rhizome clusters being carried by the upright posts impact and are divided into smaller clusters by the obstructers, and
a collector aft of the live bottom including a second inclined ramp extending from the chassis and having a live bottom mounted to move rhizomes up the second inclined ramp including upright posts that move over the live bottom to catch and push rhizomes up the inclined ramp to allow the rhizomes to be dropped into a transport container,
whereby as the chassis moves over the field of rhizome-bearing plants, the coulter disks break up soil on a top surface of the field, the digger blades scoop clusters of rhizomes from the field with adhered soil, the upright posts on the live bottom catch and push clusters of rhizomes and soil up the inclined ramp and as clusters encounter the obstructers, the cluster is broken reduce its size and to loosen and separate soil from the rhizomes, and the rhizomes are collected by the collector.

11. The apparatus as claimed in claim 10 wherein the digger blades are in line with the coulter disks in the primary direction, so that the coulter disks cut through crop residue and divide the soil along lines in the direction of travel to cause divisions laterally to be followed by the digger blades extending down into the soil to scoop up clusters of rhizomes.

12. A method of harvesting rhizomes from a field of soil in which rhizome-bearing plants have grown comprising
breaking up soil on a top surface of the field,
scooping clusters of rhizomes from broken up soil in the field with soil adhered to the rhizomes,
catching the clusters of scooped rhizomes on a mechanism that has upright posts that push the clusters of rhizomes to a location where the upright posts pass between obstructers so that clusters of rhizomes encounter the obstructers to reduce the size of the clusters and loosen and separate soil from the clusters of rhizomes, and
collecting the reduced-size clusters of rhizomes.

13. The method as claimed in claim 12 wherein the mechanism that pushes the clusters of rhizomes and the obstructers cooperate to force the reduction in size of the clusters of rhizomes.

14. The method as claimed in claim 12 wherein the obstructers cut the clusters to reduced size.

15. The method as claimed in claim 12 wherein catching and pushing the clusters of rhizomes includes pushing the clusters up a slope, so that separated soil can fall back down the slope to return to the field.

16. The method as claimed in claim 12 wherein collecting the reduced-size clusters of rhizomes includes pushing the clusters up a second slope, so that separated soil can fall to return to the field.

17. The method as claimed in claim 16 wherein pushing the clusters up a second slope includes pushing the clusters up a perforated slope so separated soil can fall through the perforations to return to the field.

18. A method of harvesting rhizomes from a field of soil in which rhizome-bearing plants have grown comprising
breaking up soil on a top surface of the field,
scooping clusters of rhizomes from broken up soil in the field with soil adhered to the rhizomes,
catching the clusters of scooped rhizomes on a mechanism that has upright posts that push the clusters of rhizomes to a location where the upright posts pass between obstructers and clusters of rhizomes encounter the obstructers that cooperate with the upright posts to cut and reduce the size of the clusters and loosen and separate soil from the clusters of rhizomes,
pushing the clusters up a slope, so that separated soil can fall back down the slope to return to the field, and
collecting the reduced-size clusters of rhizomes including pushing the clusters up a second, perforated slope, so that separated soil can fall through the perforations to return to the field.

* * * * *